(12) United States Patent
Ito et al.

(10) Patent No.: US 9,263,976 B2
(45) Date of Patent: Feb. 16, 2016

(54) MOTOR CONTROL APPARATUS

(71) Applicants: Naoyuki Ito, Aichi (JP); Hirotaka Inoue, Aichi (JP); Kei Sato, Aichi (JP)

(72) Inventors: Naoyuki Ito, Aichi (JP); Hirotaka Inoue, Aichi (JP); Kei Sato, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 14/490,325

(22) Filed: Sep. 18, 2014

(65) Prior Publication Data

US 2015/0077026 A1    Mar. 19, 2015

(30) Foreign Application Priority Data

Sep. 18, 2013 (JP) .................. 2013-193145

(51) Int. Cl.
    *G05B 11/28*    (2006.01)
    *H02P 6/00*     (2006.01)
    *B62D 5/04*     (2006.01)

(52) U.S. Cl.
    CPC .......... *H02P 6/002* (2013.01); *B62D 5/0484* (2013.01); *B62D 5/0493* (2013.01); *H02P 6/00* (2013.01); *H02P 6/001* (2013.01)

(58) Field of Classification Search
    CPC ...................................................... H02K 5/00
    USPC ........... 318/7, 8, 34, 400.01, 400.02, 400.07, 318/400.14, 400.15, 430, 432, 437, 599, 318/546, 547, 548, 800, 801; 388/804, 811, 388/819, 829, 830; 700/296; 363/21.18, 40, 363/55, 95
    See application file for complete search history.

(56) References Cited

U.S. PATENT DOCUMENTS

| | | | |
|---|---|---|---|
| 7,102,322 B2* | 9/2006 | Suzuki ........................ 318/801 |
| 7,250,740 B2* | 7/2007 | Katsuki et al. ........... 318/400.13 |
| 7,304,444 B2* | 12/2007 | Takano et al. .................. 318/34 |
| 8,674,652 B2* | 3/2014 | Maekawa ...................... 318/811 |
| 8,803,455 B2* | 8/2014 | Imamura et al. .......... 318/400.2 |
| 8,816,612 B2* | 8/2014 | Suzuki ........................ 318/139 |
| 2011/0156623 A1 | 6/2011 | Nakamura et al. |
| 2012/0187893 A1 | 7/2012 | Baba et al. |
| 2013/0134917 A1 | 5/2013 | Kaneko |

FOREIGN PATENT DOCUMENTS

| JP | 2010-226899 A | 10/2010 |
|---|---|---|
| JP | 2011-152027 A | 8/2011 |
| JP | 2012-120296 A | 6/2012 |
| JP | 2013-113695 A | 6/2013 |

\* cited by examiner

*Primary Examiner* — Antony M Paul
(74) *Attorney, Agent, or Firm* — Osha Liang LLP

(57) ABSTRACT

A motor control apparatus includes: duty calculation units that calculate a duty of a PWM signal based on a deviation between a value of a physical quantity of a motor with a command value; and a duty setting unit that performs setting of the duty based on the duty calculated by the duty calculation units. The duty setting unit maintains a present duty until new duty is input from any one of the plurality of duty calculation units, and updates the duty from the present duty to the new duty when the new duty is input from any one of the plurality of duty calculation units. A PWM signal generation unit generates the PWM signal based on the duty set by the duty setting unit and a carrier signal generated by a carrier signal generation unit.

6 Claims, 7 Drawing Sheets

MOTOR CONTROL APPARATUS

BACKGROUND OF THE INVENTION

1. Technical Field

One or more embodiments of the present invention relate to a motor control apparatus that controls a motor by a Pulse Width Modulation (PWM) method.

2. Related Art

For example, in an electric power steering apparatus of a vehicle, in order to give to a steering mechanism a steering assist force depending on a steering torque of a steering wheel, an electric motor such as a three-phase brushless motor is provided. As an apparatus for controlling rotation of the motor, a motor control apparatus using a PWM method is known.

Generally, the motor control apparatus of the PWM method includes a PWM signal generation unit that generates and outputs a PWM signal, an inverter circuit that drives the motor based on the ON/OFF states of a switching element in response to the PWM signal, a current detection unit that detects a current (a motor current) flowing in the motor, and a control unit that performs feedback control with respect to the PWM signal generation unit so as to output the PWM signal having a predetermined duty, based on a deviation between a detected value of the motor current and a target value. The motor control apparatus of such a PWM method is disclosed in JP-A-2011-152027, JP-A-2010-226899, JP-A-2012-120296, and JP-A-2013-113695.

In JP-A-2011-152027, a drive apparatus of two systems for driving a motor having two windings is provided and includes an inverter circuit in each system. Then, a PWM signal that is generated in one PWM signal generation unit is output by branching to two inverter circuits.

In JP-A-2010-226899, a drive apparatus of two systems for driving a motor having two windings is provided and includes an inverter circuit and a PWM signal generation unit in each system. Then, a PWM signal generated in each PWM signal generation unit is output to a corresponding inverter circuit.

In JP-A-2012-120296, two inverter circuits for driving two motors, respectively and one control unit for controlling the inverter circuits are provided. Furthermore, the control unit includes two PWM signal generation units. Then, a PWM signal generated in each PWM signal generation unit is output to a corresponding inverter circuit.

In JP-A-2013-113695, two inverter circuits for driving one motor and two control units for controlling the inverter circuits respectively are provided. Output sides of respective inverter circuits are coupled to each other and are connected to the motor. Then, a PWM signal generated in each of the two control units is output to a corresponding inverter circuit.

SUMMARY OF THE INVENTION

In the motor control apparatus of the PWM method, if a plurality of calculation units for calculating a duty of the PWM signal are provided, since duty calculation is performed in other calculation units even if a part of the calculation units is stopped by failure or the like, a control operation is continued. However, when the plurality of calculation units perform the duty calculations in parallel, a load of a calculation process in each calculation unit increases. On the other hand, if the plurality of calculation units perform the duty calculations in time division, the load of the calculation process is reduced in each calculation unit, but if a part of the calculation units is stopped by failure or the like, a period in which the PWM signal is not output is generated. Thus, a rotational speed of the motor decreases and in a case of an electric power steering, a required steering assist force cannot be obtained.

An object of one or more embodiments of the invention is to provide a motor control apparatus that can continue an output of a PWM signal even if a part of calculation units is stopped by failure or the like while reducing a load of a calculation process in each calculation unit.

According to one or more embodiments of the invention, there is provided a motor control apparatus including: an inverter circuit including a switching element for driving a motor by turning ON/OFF the switching element; a PWM signal generation unit that generates a PWM signal for turning ON/OFF the switching element; a carrier signal generation unit that generates a carrier signal necessary for generating the PWM signal; a physical quantity detection unit that detects a predetermined physical quantity in the motor, which is generated with drive of the motor; a command value calculation unit that calculates a command value with respect to the physical quantity of the motor; a plurality of duty calculation units, each of which compares a value of the physical quantity detected in the physical quantity detection unit with the command value calculated in the command value calculation unit and calculates a duty of the PWM signal, based on a deviation therebetween, in which a plurality of duty calculation units perform the duty calculations in time division; and a duty setting unit that performs setting of the duty, based on the duty calculated in the plurality of duty calculation units. The duty setting unit maintains a present duty until new duty is input from any one of the plurality of duty calculation units and updates the present duty to the new duty when the new duty is input from any one of the plurality of duty calculation units. The PWM signal generation unit generates the PWM signal, based on the duty that is set in the duty setting unit and the carrier signal that is generated in the carrier signal generation unit.

Thus, even if the operation of a part of the duty calculation units is stopped caused by the failure of a calculator, the duty set in the duty setting unit is maintained and the duty is output to the PWM signal generation unit. Therefore, since the PWM signal generation unit continues the output of the PWM signal having the duty, it is possible to avoid a period in which the PWM signal is not output from generating. Furthermore, since the plurality of duty calculation units perform the duty calculation in time division, it is possible to reduce the load of the calculation process in each duty calculation unit.

In one or more embodiments of the invention, the plurality of duty calculation units may be configured of a first duty calculation unit and a second duty calculation unit, the command value calculation unit may be configured of a first command value calculation unit that supplies the command value to the first duty calculation unit and a second command value calculation unit that supplies the command value to the second duty calculation unit. The motor control apparatus may further include a first calculator having the first duty calculation unit and the first command value calculation unit; a second calculator having the second duty calculation unit and the second command value calculation unit; and a third calculator having the duty setting unit and the carrier signal generation unit.

In one or more embodiments of the invention, the plurality of duty calculation units may be configured of a first duty calculation unit and a second duty calculation unit, and the command value calculation unit may be configured of a single command value calculation unit that supplies the command value to the first duty calculation unit and the second duty calculation unit. Then, the motor control apparatus may further includes a first calculator having the first duty calculation unit; a second calculator having the second duty calculation unit; a third calculator having the duty setting unit and the carrier signal generation unit; and a fourth calculator having the command value calculation unit.

In one or more embodiments of the invention, the duty setting unit may have a register that stores a numerical value of the duty calculated in the plurality of duty calculation units, and update of the duty may be performed by rewriting the numerical value of the present duty stored in the register to the numeral value of new duty when the new duty is input from any one of the plurality of duty calculation units.

According to one or more embodiments of the invention, it is possible to provide the motor control apparatus capable of even if a part of the calculation units is stopped by the failure or the like, continuing the output of the PWM signal and reducing the load of the calculation process in each calculation unit.

DETAILED EXPLANATION

Figure 1:
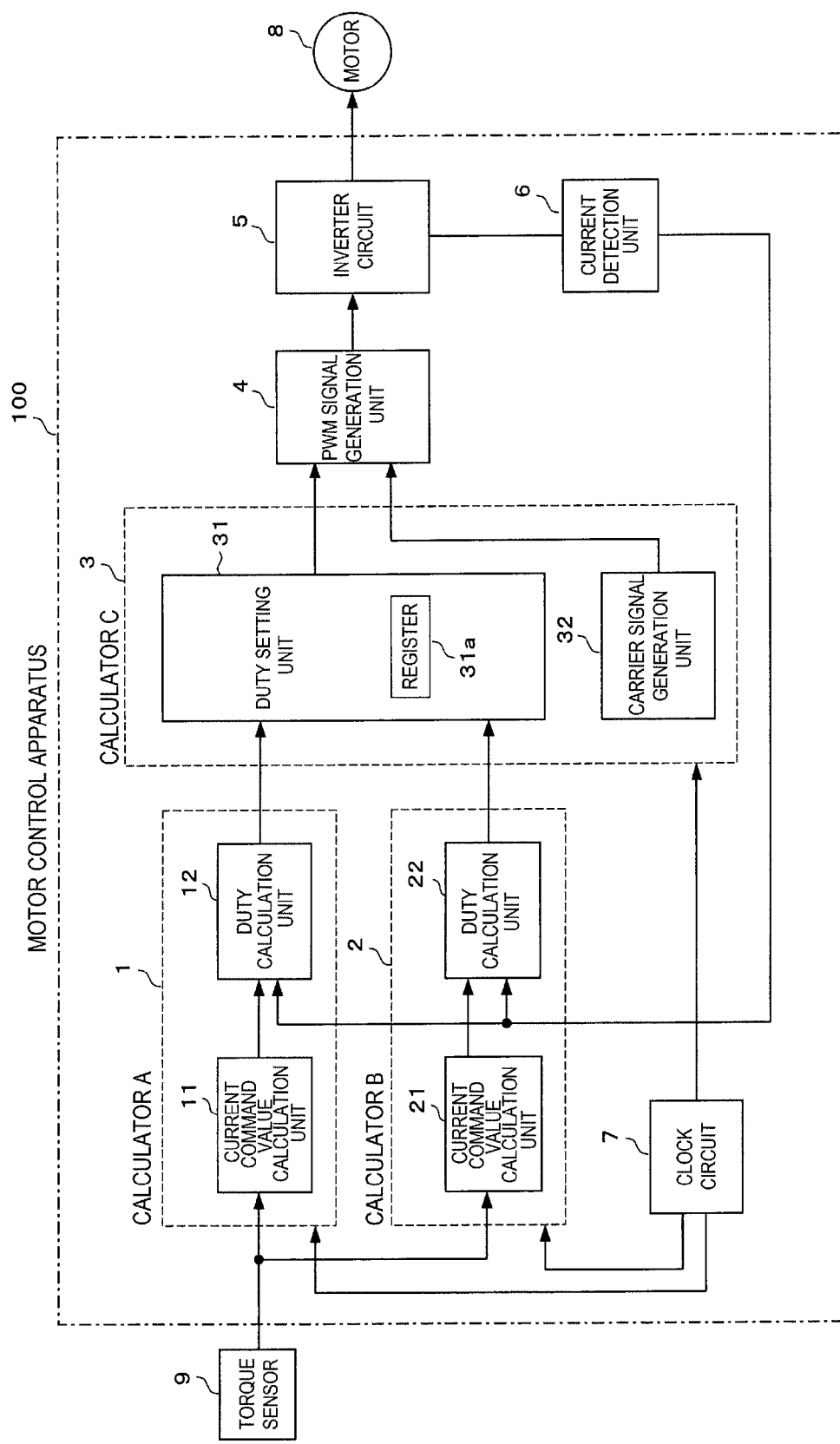
FIG. 1 is a block view of a motor control apparatus according to an embodiment of the invention.

Hereinafter, an embodiment of the invention will be described with reference to the drawings. In the drawings, the same symbols are supplied to the same portions or corresponding portions. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, a configuration of a motor control apparatus will be described with reference to FIG. 1. A motor control apparatus 100 includes a first calculator 1, a second calculator 2, a third calculator 3, a PWM signal generation unit 4, an inverter circuit 5, a current detection unit 6, and a clock circuit 7. Hereinafter, the first calculator 1 is referred to as a calculator A, the second calculator 2 is referred to as a calculator B, and the third calculator 3 is referred to as a calculator C. A motor 8 controlled by the motor control apparatus 100 is, for example, a three-phase brushless motor for steering assistance in an electric power steering apparatus. The motor control apparatus 100 controls the motor 8, based on a torque signal from a torque sensor 9 provided in a vehicle.

The calculator A includes a current command value calculation unit 11 that calculates a command value of a current to be supplied to the motor 8 and a duty calculation unit 12 that calculates a duty of a PWM signal. The torque signal from the torque sensor 9 is input into the current command value calculation unit 11. An output of the current command value calculation unit 11 and an output of the current detection unit 6 are input into the duty calculation unit 12. An output of the duty calculation unit 12 is supplied to a duty setting unit 31 of the calculator C described below.

The calculator B includes a current command value calculation unit 21 that calculates the command value of the current to be supplied to the motor 8 and a duty calculation unit 22 that calculates the duty of the PWM signal. The torque signal from the torque sensor 9 is input into the current command value calculation unit 21. An output of the current command value calculation unit 21 and an output of the current detection unit 6 are input into the duty calculation unit 22. An output of the duty calculation unit 22 is supplied to the duty setting unit 31 of the calculator C described below.

The calculator C includes the duty setting unit 31 that performs setting of the duty based on the output of the duty calculation units 12 and 22, and a carrier signal generation unit 32 that generates a carrier signal necessary for the generation of the PWM signal. An output of the duty setting unit 31 and an output of the carrier signal generation unit 32 are input into the PWM signal generation unit 4. The duty setting unit 31 will be described in detail in below.

The PWM signal generation unit 4 generates the PWM signal, based on the duty set in the duty setting unit 31 and the carrier signal generated in the carrier signal generation unit 32, and outputs the generated PWM signal to the inverter circuit 5. The PWM signal generation unit 4 will be described in detail in below.

Figure 2:
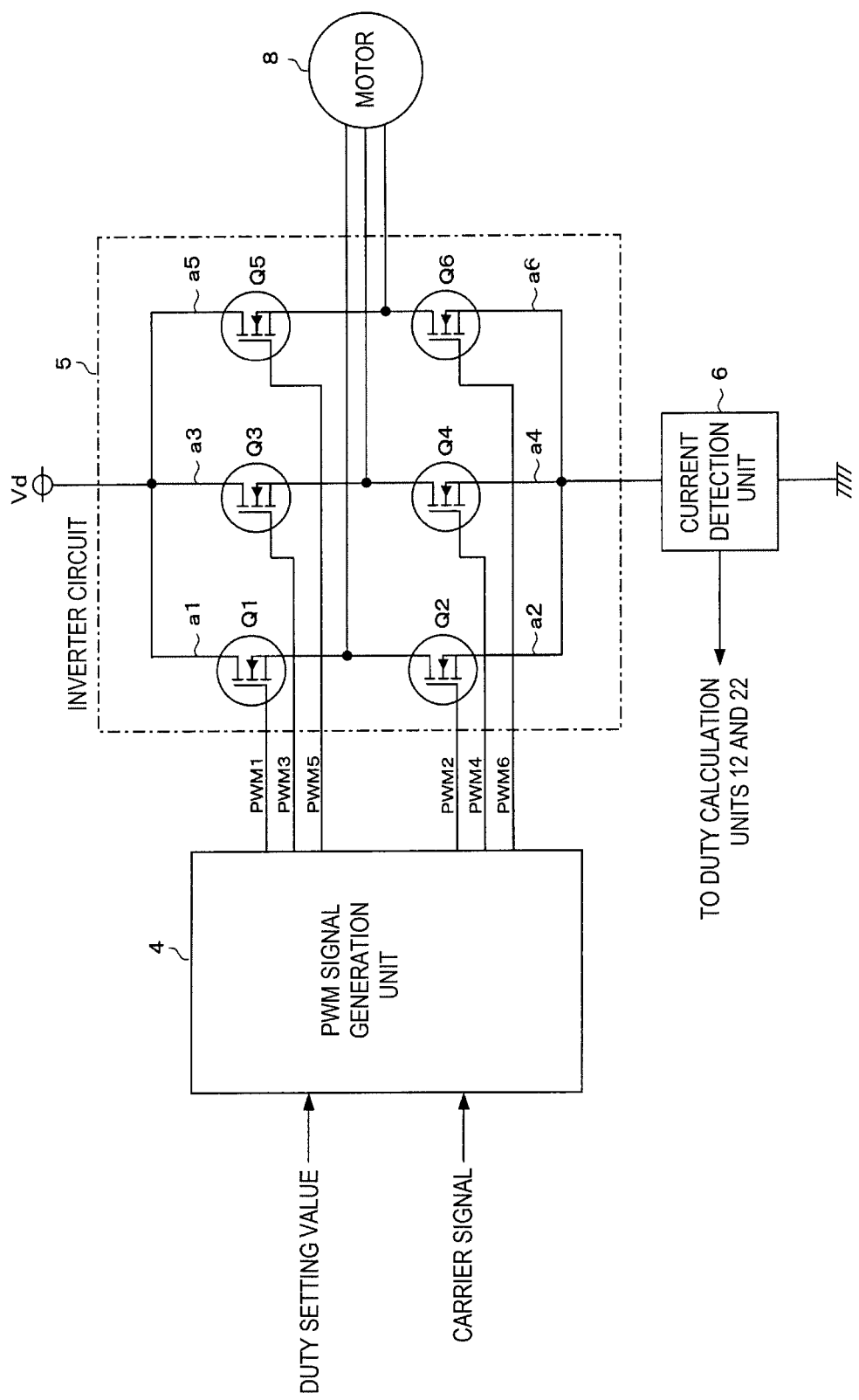
FIG. 2 is a view illustrating a specific configuration of an inverter circuit.

The inverter circuit 5 is configured of a known three-phase bridge circuit as illustrated in FIG. 2. Upper arms a1, a3, and a5 of phases are respectively provided with switching elements Q1, Q3, and Q5, and lower arms a2, a4, and a6 of phases are respectively provided with switching elements Q2, Q4, and Q6. The switching elements Q1 to Q6 consist of a field effect transistor (FET) and the PWM signals (PWM1 to PWM6) output from the PWM signal generation unit 4 are respectively supplied to gates of the switching elements Q1 to Q6. Each contact point of the upper arms a1, a3, and a5 and the lower arms a2, a4, and a6 of phases is connected to the motor 8.

The current detection unit 6 is configured of a current detection resistor (not illustrated) for detecting the current of each phase of the motor 8 flowing through the inverter circuit 5, an amplifier (not illustrated) for amplifying a voltage between both ends of the current detection resistor, or the like. The output of the current detection unit 6 is supplied to the duty calculation units 12 and 22.

The clock circuit 7 generates a clock signal for synchronizing operations of the calculators A to C and outputs the clock signal to each of the calculators A to C. The clock signal is a pulse signal having a constant period.

In the above configuration, the current flowing in the motor 8 is an example of "a physical quantity" in one or more embodiments of the invention and the current detection unit 6 is an example of "a physical quantity detection unit" in one or more embodiments of the invention. The current command value calculation unit 11 is an example of "a first command value calculation unit" in one or more embodiments of the invention and the current command value calculation unit 21 is an example of "a second command value calculation unit" in one or more embodiments of the invention. The duty calculation unit 12 is an example of "a first duty calculation unit" in one or more embodiments of the invention and the duty calculation unit 22 is an example of "a second duty calculation unit" in one or more embodiments of the invention.

Next, an operation of the motor control apparatus 100 described above will be described. The torque sensor 9 detects a value of the torque generated from steering the steering wheel of the vehicle and outputs the detected torque value to the motor control apparatus 100 as a torque signal. In the motor control apparatus 100, the current command value calculation unit 11 of the calculator A calculates the command value of the current to be supplied to the motor 8, based on the torque value supplied from the torque sensor 9. Furthermore, the current command value calculation unit 21 of the calculator B also calculates the command value of the current to be supplied to the motor 8, based on the torque value supplied from the torque sensor 9.

The duty calculation unit 12 of the calculator A calculates the duty of the PWM signal, based on the current command value supplied from the current command value calculation unit 11 and a detected value of the motor current of each phase supplied from the current detection unit 6 at a predetermined timing. Specifically, the duty calculation unit 12 calculates a deviation between both sides by comparing the detected value of the motor current and the current command value. Then, calculation of the duty is performed so that the deviation becomes zero, that is, the value of the motor current is equal to the current command value.

Figure 3:
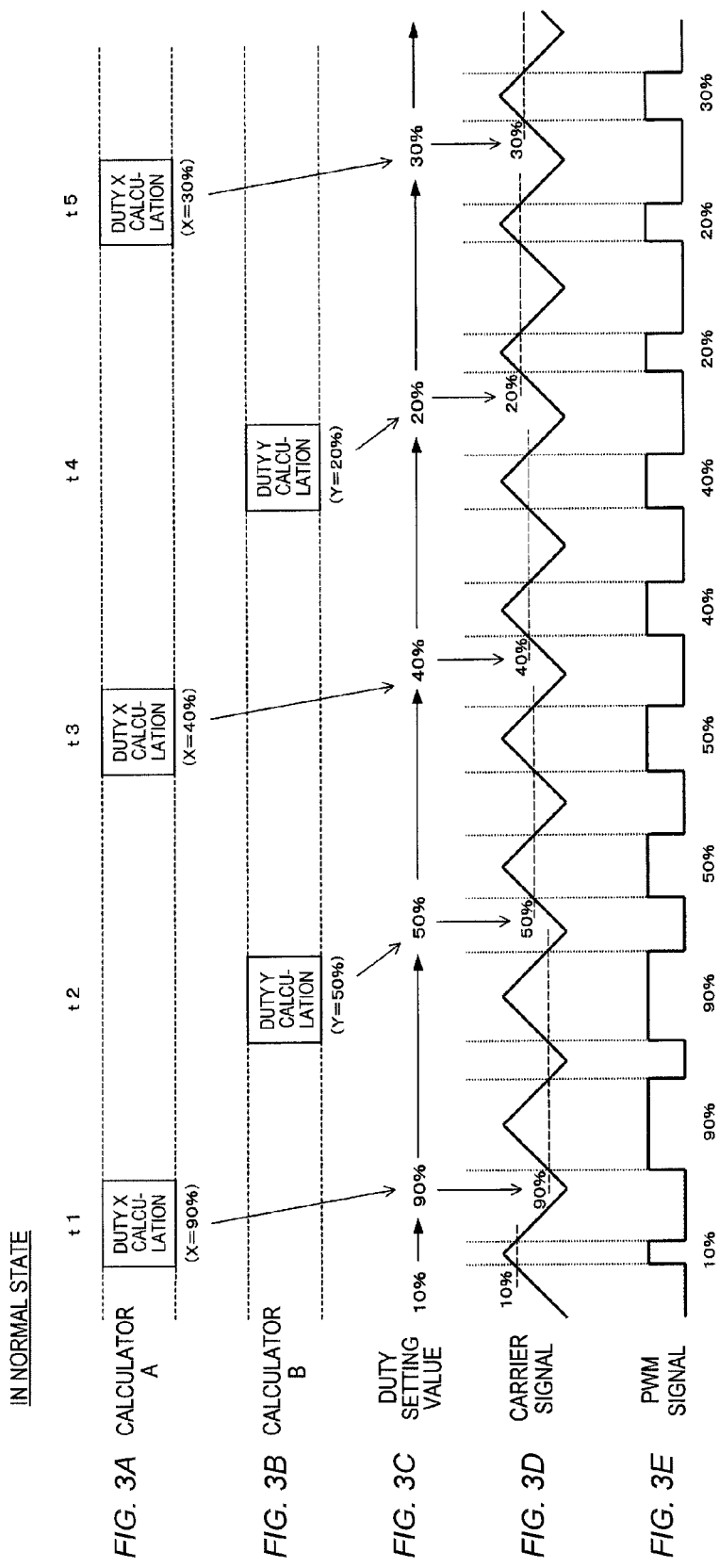
FIGS. 3A to 3E are timing charts illustrating an operation in a normal state.

Similar to the duty calculation unit 12 of the calculator A, the duty calculation unit 22 of the calculator B calculates the duty of the PWM signal, based on the current command value supplied from the current command value calculation unit 21 and the detected value of the motor current of each phase supplied from the current detection unit 6 in a different timing from the predetermined timing. Therefore, as illustrated in FIGS. 3A and 3B described below, the calculator A and the calculator B perform the duty calculation alternately in time division.

The duty calculated in the duty calculation unit 12 of the calculator A and the duty calculated in the duty calculation unit 22 of the calculator B are output to the duty setting unit 31 of the calculator C. The duty setting unit 31 has a register 31$a$ in which a numeral value of the duty is stored. Then, the numeral value of the present duty set in the register 31$a$ is held until new duty is input. Furthermore, if the new duty is input, the numeral value of the present duty set in the register 31$a$ is rewritten to the numeral value of the new duty. Therefore, the numeral value of the duty set in the register 31$a$ is updated whenever the new duty calculated in the duty calculation unit 12 of the calculator A or the new duty calculated in the duty calculation unit 22 of the calculator B is input. The duty setting unit 31 outputs the duty set in the register 31$a$ to the PWM signal generation unit 4.

Figure 7A:
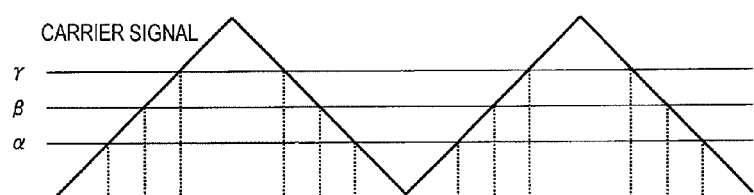
FIGS. 7A to 7D are waveform views illustrating a principle of PWM signal generation.

On the other hand, the carrier signal necessary for the generation of the PWM signal is generated in the carrier signal generation unit 32. For example, the carrier signal is a triangle wave as illustrated in FIG. 7A. Moreover, the carrier signal is not limited to the triangle wave and may use a saw tooth wave.

The PWM signal generation unit 4 generates the PWM signal having the duty, based on the duty output from the duty setting unit 31 and the carrier signal output from the carrier signal generation unit 32. A generation method of the PWM signal is known, but description thereof is supplied briefly in below.

Figure 7B:
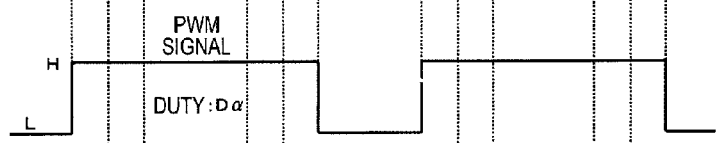
Figure 7C:
Figure 7D:

As illustrated in FIG. 7A, thresholds $\alpha$, $\beta$, and $\gamma$ are set depending on the duty with respect to voltage levels of the carrier signal. Then, a period in which the voltage level of the carrier signal is equal to or more than the threshold is referred to as "H" (High) and a period in which the voltage level of the carrier signal is less than the threshold is referred to as "L" (Low), and the carrier signal is binarized. Therefore, as illustrated in FIGS. 7B to 7D, the PWM signal having duties D$\alpha$, D$\beta$, and D$\gamma$ depending on the thresholds $\alpha$, $\beta$, and $\gamma$ is obtained. The period of "H" is shortened and the duty of the PWM signal becomes small as a level of the threshold is high, and the period of "H" is lengthened and the duty of the PWM signal becomes large as the level of the threshold is low. Therefore, it is possible to generate the PWM signal having a desired duty by adjusting the threshold.

The PWM signal generation unit 4 generates the PWM signals (PWM1 to PWM6 of FIG. 2) of respective phases as described above and outputs the PWM signals to the gates of the switching elements Q1 to Q6 of the inverter circuit 5.

The switching elements Q1 to Q6 of the inverter circuit 5 perform ON/OFF operation by the PWM signals supplied from the PWM signal generation unit 4. Therefore, the current supplies to the motor 8 from a power supply Vd (FIG. 2) through the inverter circuit 5 and the motor 8 rotates. Then, a size or a direction of the current supplied to the motor 8 is controlled according to a pattern of ON/OFF of the switching elements Q1 to Q6 depending on the duty and the phase of the PWM signal.

FIGS. 3A to 3E are timing charts illustrating an operation of the motor control apparatus 100 in a normal state. In FIGS. 3A to 3E, FIG. 3A indicates the operation of the calculator A, FIG. 3B indicates the operation of the calculator B, FIG. 3C indicates the duty setting value set in the register 31$a$ of the duty setting unit 31, FIG. 3D indicates the carrier signal (triangle wave) generated in the carrier signal generation unit 32, and FIG. 3E indicates the PWM signal generated in the PWM signal generation unit 4.

As illustrated in FIGS. 3A and 3B, the duty calculation unit 12 of the calculator A and the duty calculation unit 22 of the calculator B perform the duty calculation alternately at different timings in time division. In a state where the present duty is 10%, at a timing t1, as illustrated in FIG. 3A, if a duty X=90% is calculated in the duty calculation unit 12 of the calculator A, as illustrated in FIG. 3C, the duty setting value of the duty setting unit 31 is updated from 10% to 90%. Then, as illustrated in FIG. 3D, the threshold with respect to the carrier signal is changed from the threshold corresponding to 10% to the threshold corresponding to 90%. As a result, as illustrated in FIG. 3E, the PWM signal generation unit 4 generates and outputs the PWM signal of the duty of 90%. Thereafter, this state is maintained until the new duty is calculated in the duty calculation units 12 and 22.

Thereafter, at a timing t2, as illustrated in FIG. 3B, if a duty Y=50% is calculated in the duty calculation unit 22 of the calculator B, as illustrated in FIG. 3C, the duty setting value of the duty setting unit 31 is updated from 90% to 50%. Then, as illustrated in FIG. 3D, the threshold with respect to the carrier signal is changed from the threshold corresponding to 90% to the threshold corresponding to 50%. As a result, as illustrated in FIG. 3E, the PWM signal generation unit 4 generates and outputs the PWM signal of the duty of 50%. Thereafter, this state is maintained until the new duty is calculated in the duty calculation units 12 and 22.

Thereafter, at a timing t3, as illustrated in FIG. 3A, if the duty X=40% is calculated in the duty calculation unit 12 of the calculator A, as illustrated in FIG. 3C, the duty setting value of the duty setting unit 31 is updated from 50% to 40%. Then, as illustrated in FIG. 3D, the threshold with respect to the carrier signal is changed from the threshold corresponding to 50% to the threshold corresponding to 40%. As a result, as illustrated in FIG. 3E, the PWM signal generation unit 4 generates and outputs the PWM signal of the duty of 40%. Thereafter, this state is maintained until the new duty is calculated in the duty calculation units 12 and 22.

Thereafter, at a timing t4, as illustrated in FIG. 3B, if the duty Y=20% is calculated in the duty calculation unit 22 of the calculator B, as illustrated in FIG. 3C, the duty setting value of the duty setting unit 31 is updated from 40% to 20%. Then, as illustrated in FIG. 3D, the threshold with respect to the carrier signal is changed from the threshold corresponding to 40% to the threshold corresponding to 20%. As a result, as illustrated in FIG. 3E, the PWM signal generation unit 4 generates and outputs the PWM signal of the duty of 20%. Thereafter, this state is maintained until the new duty is calculated in the duty calculation units 12 and 22.

Thereafter, at a timing t5, as illustrated in FIG. 3A, if the duty X=30% is calculated in the duty calculation unit 12 of the calculator A, as illustrated in FIG. 3C, the duty setting value of the duty setting unit 31 is updated from 20% to 30%. Then, as illustrated in FIG. 3D, the threshold with respect to the carrier signal is changed from the threshold corresponding to 20% to the threshold corresponding to 30%. As a result, as illustrated in FIG. 3E, the PWM signal generation unit 4 generates and outputs the PWM signal of the duty of 30%. Thereafter, this state is maintained until the new duty is calculated in the duty calculation units 12 and 22.

Hereinafter, similarly, the duty calculation units 12 and 22 alternately perform the calculation of the duty. Then, the present duty set in the duty setting unit 31 is maintained until new duty is output from one of the duty calculation units 12 and 22. On the other hand, if new duty is output from one of the duty calculation units 12 and 22, the present duty set in the duty setting unit 31 is updated to the new duty.

Figure 4:
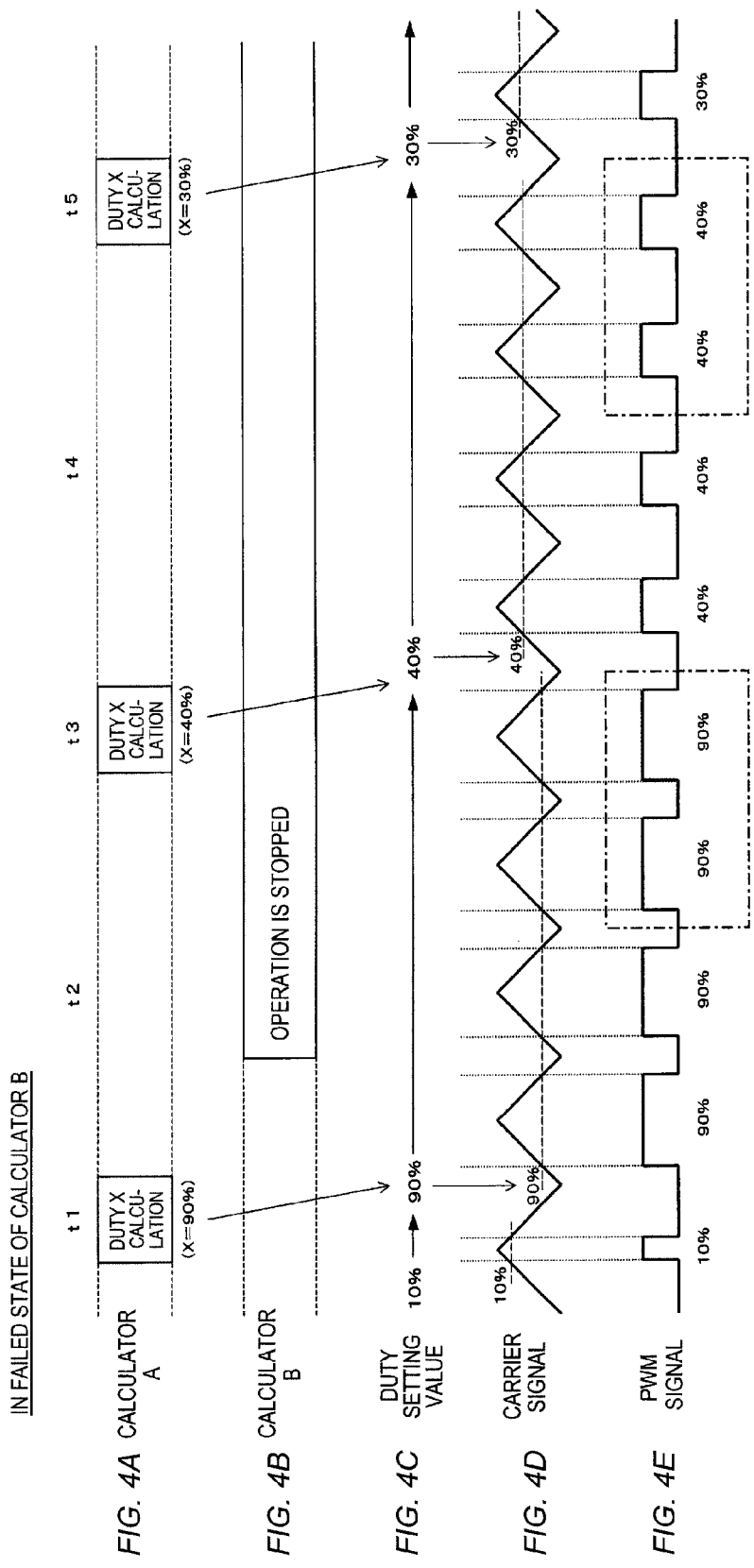
FIGS. 4A to 4E are timing charts illustrating an operation in a failed state of a second calculator.

FIGS. 4A to 4E are timing charts illustrating the operation of the motor control apparatus 100 in a failed state of the calculator B. If the calculator B fails, as illustrated in FIG. 4B, the operation of the calculator B is stopped and the duty calculation after the timing t2 is not executed. On the other hand, the calculator A is normally operated and as illustrated in FIG. 4A, the duty calculation is executed at a predetermined timing. Then, even if the operation of the calculator B is stopped, as illustrated in FIG. 4C, the state where the duty X=90% is set that is calculated in the duty calculation unit 12 of the calculator A is continued in the duty setting unit 31. Thus, even if the duty calculation is not performed by the calculator B at the timing t2, the PWM signal generation unit 4 continues the output of the PWM signal of the duty of 90% as indicated in a portion surrounded by a one-dot chain line on the left side of FIG. 4E.

Thereafter, at the timing t3, as illustrated in FIG. 4A, if the duty X=40% is calculated in the duty calculation unit 12 of the calculator A, as illustrated in FIG. 4C, the duty setting value of the duty setting unit 31 is updated from 90% to 40%. Then, as illustrated in FIG. 4D, the threshold with respect to the carrier signal is changed from the threshold corresponding to 90% to the threshold corresponding to 40%. As a result, as illustrated in FIG. 4E, the PWM signal generation unit 4 generates and outputs the PWM signal of the duty of 40%. Therefore, even if the duty calculation is not performed by the calculator B at the timing t4, the PWM signal generation unit 4 continues the output of the PWM signal of the duty of 40% as indicated in a portion surrounded by a one-dot chain line on the right side of FIG. 4E.

Thereafter, at the timing t5, as illustrated in FIG. 4A, if the duty X=30% is calculated in the duty calculation unit 12 of the calculator A, as illustrated in FIG. 4C, the duty setting value of the duty setting unit 31 is updated from 40% to 30%. Then, as illustrated in FIG. 4D, the threshold with respect to the carrier signal is changed from the threshold corresponding to 40% to the threshold corresponding to 30%. As a result, as illustrated in FIG. 4E, the PWM signal generation unit 4 generates and outputs the PWM signal of the duty of 30%.

In the above, a failed state of the calculator B is described, but even in a failed state of the calculator A, the same operation is performed. FIGS. 5A to 5E are timing charts illustrating the operation of the motor control apparatus 100 in the failed state of the calculator A.

Figure 5:
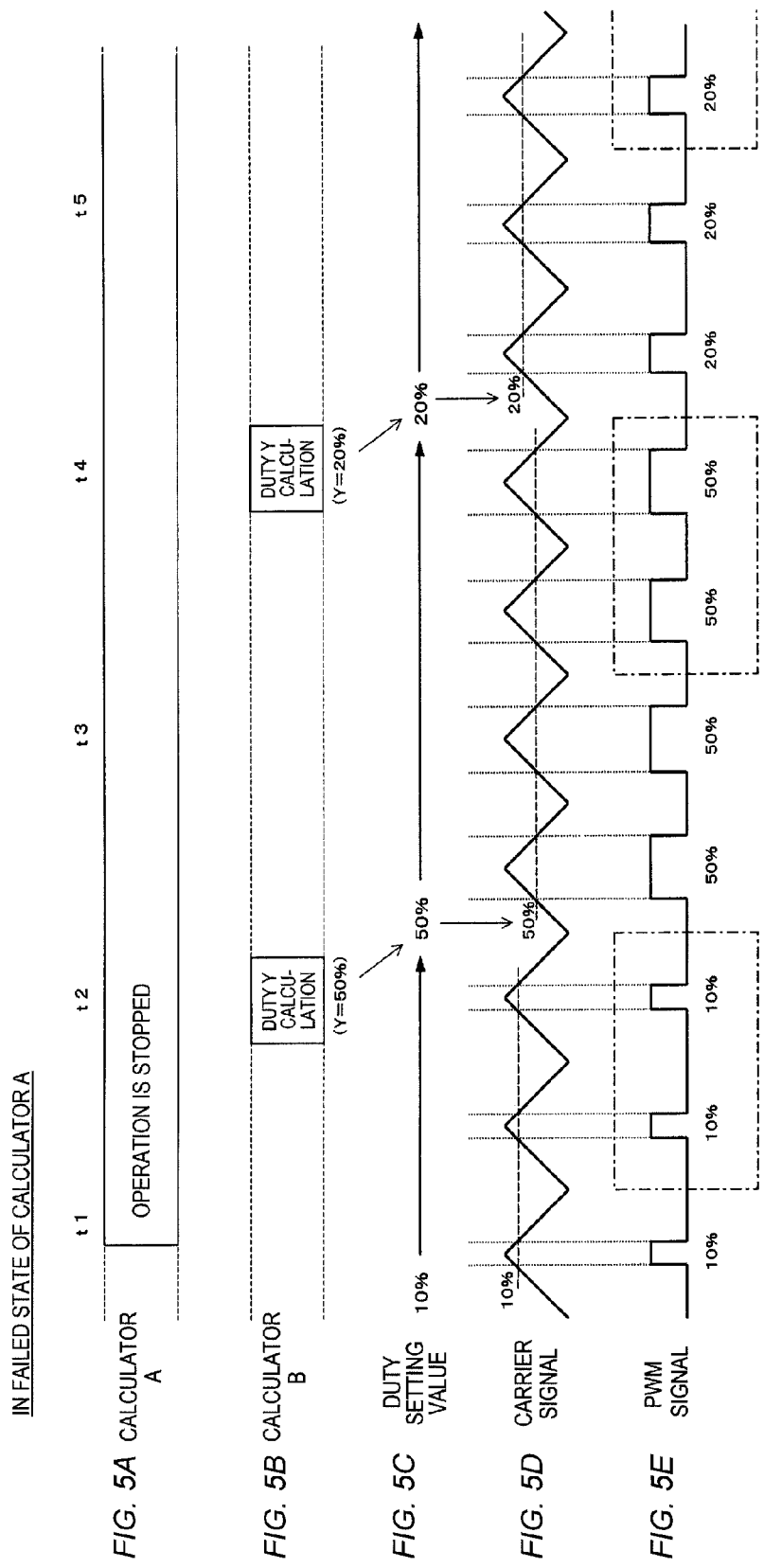
FIGS. 5A to 5E are timing charts illustrating an operation in a failed state of a first calculator.

If the calculator A is failed, as illustrated in FIG. 5A, the operation of the calculator A is stopped and the duty calculation after the timing t1 is not executed. On the other hand, the calculator B is normally operated and as illustrated in FIG. 5B, the duty calculation is executed at a predetermined timing. Therefore, at the timings t1, t3, and t5, even if the duty calculation is not performed by the calculator A, the PWM signal generation unit 4 continues the output of the PWM signal having a predetermined duty as indicated in a portion surrounded by a one-dot chain line of FIG. 5E.

As described above, in the embodiment, the duty calculation unit 12 of the calculator A and the duty calculation unit 22 of the calculator B perform alternately the duty calculation in time division and output the calculated duty to the duty setting unit 31. Then, the duty setting unit 31 maintains the present duty until new duty is input from the duty calculation units 12 and 22, and when new duty is input from the duty calculation units 12 and 22, the duty is updated.

Thus, even if one of the calculators A and B is failed and the operation of the duty calculation unit 12 or the duty calculation unit 22 is stopped, the duty set in the duty setting unit 31 is maintained and the duty is output to the PWM signal generation unit 4. Therefore, since the PWM signal generation unit 4 continues the output of the PWM signal having the duty, it is possible to avoid the period in which the PWM signal is not output from generating. As a result, even if one of the calculators A and B is failed, it is possible to ensure the steering assist force that is necessary without greatly reducing the rotational speed of the motor 8. Furthermore, since two calculators A and B perform the duty calculation in time division, it is possible to reduce the load of the calculation process in each calculator.

Figure 6:
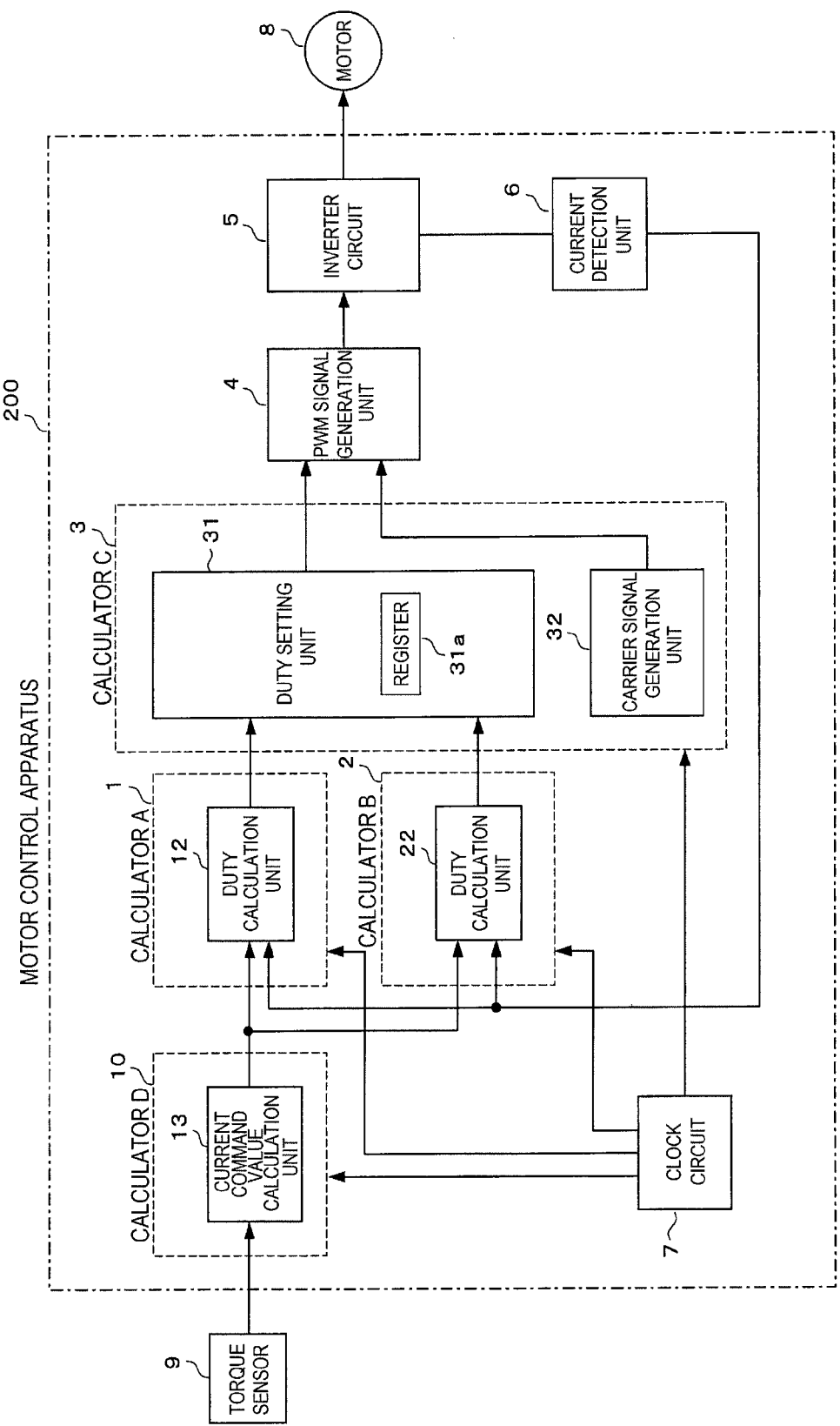
FIG. 6 is a block view of a motor control apparatus according to another embodiment of the invention.

FIG. 6 illustrates a motor control apparatus 200 according to another embodiment. In the embodiment, a calculator A includes only the duty calculation unit 12 and a calculator B only includes the duty calculation unit 22. Then, a calculator D (fourth calculator 10) including a single current command value calculation unit 13 giving the current command value to the duty calculation units 12 and 22 is provided. The duty calculation units 12 and 22 alternately perform the duty calculation in time division, based on the current command value from the common current command value calculation unit 13. The clock circuit 7 supplies the clock signal to each of the calculators A to D. Since the other configuration is the same as that of the motor control apparatus 100 of FIG. 1, the description of the overlapped portion is omitted.

In one or more embodiments of the invention, it is possible to adopt various embodiments other than those described above. For example, in the embodiments described above, two duty calculation units 12 and 22 are provided, but three or more duty calculation units may be provided.

In the embodiments described above, as the physical quantity detection unit, the current detection unit 6 that detects the current of the motor 8 is provided and as the command value calculation unit, the current command value calculation units 11 and 21 that calculate the current command value with respect to the current of the motor 8 are provided, but the invention is not limited to the embodiments. For example, as the physical quantity detection unit, a rotational speed detection unit that detects the rotational speed of the motor 8 may be provided and as the command value calculation unit, a rotational speed command value calculation unit that calculates a rotational speed command value with respect to the rotational speed of the motor 8 may be provided. That is, the physical quantity detection unit may be good as long as it detects the physical quantity such as the current or the rotational speed in the motor 8, which is generated according to the drive of the motor 8, and the command value calculation unit may be good as long as it calculates the command value with respect to the physical quantity.

Furthermore, in the embodiments described above, an example in which the motor 8 is controlled is given, based on the torque value applied from the torque sensor 9, but the invention is not limited to embodiments. For example, it is possible to apply one or more embodiments of the invention even to a case where the motor 8 is controlled, based on a speed value supplied from a vehicle speed sensor.

Furthermore, in the embodiments described above, the control apparatus of the three-phase motor is described, but embodiments of the invention are not limited to the three-phase motor, and one or more embodiments of the invention can be applied to a control apparatus of a four or more-phase motor. In this case, a pair of upper and lower arms are provided in as many as the number of the phases in the inverter circuit 5.

Furthermore, in the embodiments described above, the FET is exemplified as the switching elements Q1 to Q6 of the inverter circuit 5, but other switching elements such as an insulated gate bipolar transistor (IGBT) may be used.

Furthermore, in the embodiments described above, the brushless motor is exemplified as the motor 8, but one or more embodiments of the invention can also be applied to a case of controlling a motor other than the brushless motor.

Furthermore, in the embodiments described above, the motor control apparatus used in the electric power steering apparatus of the vehicle is exemplified, but one or more embodiments of the invention can be also applied to a motor control apparatus used in an apparatus other than the electric power steering apparatus.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited by the attached claims.

What is claimed is:

1. A motor control apparatus comprising:
    an inverter circuit including a switching element for driving a motor by turning ON/OFF the switching element;
    a PWM signal generation unit that generates a PWM signal for turning ON/OFF the switching element;
    a carrier signal generation unit that generates a carrier signal necessary for generating the PWM signal;
    a physical quantity detection unit that detects a predetermined physical quantity of the motor, which is generated with drive of the motor;
    a command value calculation unit that calculates a command value with respect to the physical quantity of the motor;
    a plurality of duty calculation units, each of which compares a value of the physical quantity detected by the physical quantity detection unit with the command value calculated in the command value calculation unit and calculates a duty of the PWM signal based on a deviation between the value of the physical quantity and the command value, wherein the plurality of duty calculation units perform the duty calculations in time division; and
    a duty setting unit that performs setting of the duty based on the duty calculated by the plurality of duty calculation units,
    wherein the duty setting unit maintains a present duty until new duty is input from any one of the plurality of duty calculation units, and updates the duty from the present duty to the new duty when the new duty is input from any one of the plurality of duty calculation units, and
    wherein the PWM signal generation unit generates the PWM signal based on the duty set by the duty setting unit and the carrier signal generated by the carrier signal generation unit.

2. The motor control apparatus according to claim 1,
    wherein the plurality of duty calculation units include a first duty calculation unit and a second duty calculation unit,
    wherein the command value calculation unit includes a first command value calculation unit that supplies the command value to the first duty calculation unit and a second command value calculation unit that supplies the command value to the second duty calculation unit, and
    wherein the motor control apparatus further comprises:
        a first calculator including the first duty calculation unit and the first command value calculation unit;
        a second calculator including the second duty calculation unit and the second command value calculation unit; and
        a third calculator including the duty setting unit and the carrier signal generation unit.

3. The motor control apparatus according to claim 2,
    wherein the duty setting unit comprises a register that stores a numeral value of the duty calculated by the plurality of duty calculation units, and
    wherein the duty is updated by rewriting the numerical value stored in the register from the numerical value of the present duty to the numeral value of new duty when the new duty is input from any one of the plurality of duty calculation units.

4. The motor control apparatus according to claim 1,
    wherein the plurality of duty calculation units include a first duty calculation unit and a second duty calculation unit,
    wherein the command value calculation unit includes a single command value calculation unit that supplies the command value to the first duty calculation unit and the second duty calculation unit, and
    wherein the motor control apparatus further comprises:
        a first calculator comprising the first duty calculation unit;
        a second calculator comprising the second duty calculation unit;
        a third calculator comprising the duty setting unit and the carrier signal generation unit; and
        a fourth calculator comprising the command value calculation unit.

5. The motor control apparatus according to claim 4,
    wherein the duty setting unit comprises a register that stores a numeral value of the duty calculated by the plurality of duty calculation units, and
    wherein the duty is updated by rewriting the numerical value stored in the register from the numerical value of the present duty to the numeral value of new duty when the new duty is input from any one of the plurality of duty calculation units.

6. The motor control apparatus according to claim 1,
wherein the duty setting unit comprises a register that stores a numeral value of the duty calculated by the plurality of duty calculation units, and
wherein the duty is updated by rewriting the numerical value stored in the register from the numerical value of the present duty to the numeral value of new duty when the new duty is input from any one of the plurality of duty calculation units.

* * * * *